(12) United States Patent
Takahashi

(10) Patent No.: US 8,029,180 B2
(45) Date of Patent: Oct. 4, 2011

(54) LIGHT UNIT, BACKLIGHT, FRONTLIGHT, AND DISPLAY DEVICE

(75) Inventor: Yuhji Takahashi, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 201 days.

(21) Appl. No.: 12/301,240

(22) PCT Filed: Apr. 13, 2007

(86) PCT No.: PCT/JP2007/058197
§ 371 (c)(1),
(2), (4) Date: Nov. 18, 2008

(87) PCT Pub. No.: WO2008/007487
PCT Pub. Date: Jan. 17, 2008

(65) Prior Publication Data
US 2009/0185394 A1    Jul. 23, 2009

(30) Foreign Application Priority Data
Jul. 11, 2006    (JP) .................................. 2006-190859

(51) Int. Cl.
*F21V 7/04* (2006.01)
(52) U.S. Cl. ........................... 362/612; 362/613; 349/65
(58) Field of Classification Search .................. 362/612, 362/613; 349/65
See application file for complete search history.

(56) References Cited

U.S. PATENT DOCUMENTS

| | | | |
|---|---|---|---|
| 7,591,563 B2 * | 9/2009 | Chou et al. | ..................... 362/613 |
| 2001/0033482 A1 | 10/2001 | Funamoto et al. | |
| 2002/0175632 A1 | 11/2002 | Takeguchi | |
| 2003/0076669 A1 | 4/2003 | Itoh et al. | |
| 2003/0147257 A1 | 8/2003 | Lee | |
| 2005/0024847 A1 | 2/2005 | Ahn et al. | |
| 2005/0141244 A1 | 6/2005 | Hamada et al. | |
| 2005/0174318 A1 | 8/2005 | Chou et al. | |

FOREIGN PATENT DOCUMENTS

| | | |
|---|---|---|
| CN | 1570733 A | 1/2005 |
| EP | 1 403 688 A2 | 3/2004 |
| JP | 2000-221500 A | 8/2000 |
| JP | 2001-043718 A | 2/2001 |

(Continued)

OTHER PUBLICATIONS

Official Communication issued in International Patent Application No. PCT/JP2007/058197, mailed on Jul. 17, 2007.

(Continued)

*Primary Examiner* — Stephen F Husar
(74) *Attorney, Agent, or Firm* — Keating & Bennett, LLP

(57) ABSTRACT

A light unit, a backlight, a front light, and a display device, have a structure such that an uneven luminance generated in display is suppressed by radiating light in a sufficient amount even to an end portion of a display region, thereby uniformly radiating light in a sufficient amount to the entire display region, without a complicated structure. The light unit includes a light guide plate and a plurality of light sources, the plurality of light sources being arranged in a line to oppose at least one side surface of the light guide plate, wherein one or more light sources at at least one terminal among the plurality of light sources are positioned outside a lateral edge of a display region, and such a light unit is preferably used in a side-light type backlight or front light.

14 Claims, 10 Drawing Sheets

FOREIGN PATENT DOCUMENTS

| | | |
|---|---|---|
| JP | 2002-075038 A | 3/2002 |
| JP | 2002-093232 A | 3/2002 |
| JP | 2002-100231 A | 4/2002 |
| JP | 2002-157911 A | 5/2002 |
| JP | 2002-203422 A | 7/2002 |
| JP | 2002-350846 A | 12/2002 |

OTHER PUBLICATIONS

Official Communication issued in corresponding European Search Report 07741633.7, mailed on Mar. 19, 2010.

* cited by examiner

LIGHT UNIT, BACKLIGHT, FRONTLIGHT, AND DISPLAY DEVICE

BACKGROUND OF THE INVENTION

1. Field of the Invention

The present invention relates to a light-unit, a backlight, a front light, and a display device. More specifically, the present invention relates to a light unit preferably used in a side-light type backlight or front light, and a display device such as a liquid crystal display device, including the light unit.

2. Description of the Related Art

A display device including a non-self-emitting display panel, such as a liquid crystal display panel, needs to include light sources in order to display an image. Reflected sunlight is used as a light source, but a light unit needs to be arranged in the following display devices: a display device which is mainly used indoors such as a word processor, a laptop personal computer, and an in-car liquid crystal display device (LCD); and a display device which is used outdoors but constantly needs a certain light amount.

Side-light type and direct-type backlights and the like are known as the light unit. A side-light type backlight in a liquid crystal display device including a small-sized screen has been widely used because it can display an image with a small power consumption using a small number of light sources.

Examples of members for the backlight include, for example, a reflective film, a diffusion sheet, and a prism sheet, in addition to the light source. The side-light type backlight has a structure in which light sources are arranged on a lateral edge of a display surface, and therefore the backlight is further provided with a light guide plate, which is different from the direct-type backlight. The light guide plate is generally made of a colorless and transparent material, and it is a plate member with which a pattern for reflecting, refracting, or diffusing light is provided. Furthermore, according to the side-light type backlight, the light guide plate is arranged below the display panel such that the main surface of the light guide plate faces the display screen and such that point light sources or linear light sources are arranged to oppose a side surface of the light guide plate. According to such a configuration, lights from the point light sources or linear light sources enter the light guide plate from the side surface of the light guide plate. Further, the lights are reflected, refracted, or diffused by the pattern provided for the light guide plate when passing through the inside of the light guide plate, and then the lights are emitted into a planar shape from the main surface side.

In the display device, a frontlight may be used instead of the backlight. According to a side-light type frontlight, point light sources or linear light sources are arranged to face a side surface of a light guide plate, similarly in the backlight. Lights from the point light sources or the linear light sources enter the light guide plate from the side surface of the light guide plate. Further, the lights are reflected, refracted, or diffused by the pattern provided for the light guide plate when passing through the inside of the light guide plate, and then the lights are once outputted into a planar shape from the main surface side to the display screen side as output light. In the frontlight, the light guide plate is arranged on the side opposite to the side where the light guide plate is arranged in the backlight relative to a liquid crystal layer. Lights which have passed through the light guide plate are reflected by a reflector such as a reflective sheet, provided on the side opposite to the light guide plate relative to the liquid crystal layer. Therefore, the lights pass through the liquid crystal layer twice.

Recently, the use of a thin display device, such as a liquid crystal display device, has increasingly spread. Along with this, such a display device needs higher display qualities. For the side-light type backlight or frontlight, it is necessary to increase a luminance of light outputted through the light guide plate and further increase uniformity of the luminance.

For such a need, luminance characteristics have conventionally been improved by modifying a structure of the light guide plate or arrangement of light sources (for example, refer to Japanese Kokai Publication No. 2001-43718, Japanese Kokai Publication No. 2002-100231, Japanese Kokai Publication No. 2002-157911, Japanese Kokai Publication No. 2003-132722, Japanese Kokai Publication No. 2002-203422, and Japanese Kokai Publication No. 2002-350846). For example, Japanese Kokai Publication No. 2001-43718 discloses the following light unit. A light source portion in a light guide plate is provided with a reflection and refraction portion and thereby part of the light, with a high luminance near the center, emitted from a light emitting diode (LED), is not directly guided into an output portion, but into both side surfaces. Further, irregular reflection parts on both side surfaces are arranged in such a way that an area ratio of the irregular reflection portion increases as it is further from the light sources, and thereby a light amount near the light sources is suppressed and lights from the LED light sources are uniformly output from an output surface with efficiency. Japanese Kokai Publication No. 2002-100231 discloses that point light sources are arranged at a pair of opposing corners of a light guide plate, and a light guide portion having a light-entering surface and a reflection surface is formed integrally with the light guide plate so as to protrude outwardly. As a result, light from the light sources is spread over the entire light guide plate, and generation of uneven luminance is prevented. However, even if these technologies are used, a dark portion where the luminance is low is generated at a position far from the light source or at a corner portion of the display region, or the backlight or the frontlight might have a complicated structure. In such points, there is room for improvement.

In the side-light type backlight or frontlight, a cold cathode fluorescent lamp (CCFL) that is a linear light source or an LED that is a point light source, and the like are used as a light source. Recently, LEDs tend to be increasingly used because they can be driven at a low voltage. For example, an LED has been used in a display of a portable apparatus such as a cellular phone. However, if a light source which emits light with a strong straight forward property, such as an LED, is used, uneven luminance and the like tends to be generated. In this point, there is room for improvement. For example, if an LED is used as the light source, a sidelight type backlight or front light includes, as shown in FIG. 15A, a rectangular light guide plate 201 and a plurality of light sources 203 arranged in a line to oppose one side surface on the side of a long side of four sides of the rectangular light guide plate 201. As shown in FIG. 15B, light sources 203a at both terminals of these light sources 203 are arranged in a region opposing an end portion 102a of the display region 102. However, according to such a light-irradiating method, an end portion 102a of the display region, particularly at a corner portion 102b is not sufficiently irradiated with light in a sufficient amount. Therefore, this region becomes a dark portion where the luminance is lower than that in other display regions. As a result, display uniformity is deteriorated. FIG. 15B schematically shows overlapping of lights from the respective light sources. FIG. 15C shows measurement results of a luminance distribution. As shown in FIGS. 15B and 15C, a dark portion is generated at the end portion 102a of the display region, particularly at a corner portion 102b. The luminance uniformity in the entire display region 102 is deteriorated.

Under such circumstances, a light unit which can obtain sufficient luminance at the end portion of the display region and which can radiate light having a high luminance and excellent uniformity to the entire display region, without a complicated structure, has been needed.

SUMMARY OF THE INVENTION

Preferred embodiments of the present invention have been developed in view of the above-mentioned problems, and the preferred embodiments of the present invention provide a light unit, a backlight, a frontlight, and a display device, in which uneven luminance generated in displaying an image is suppressed by radiating light in a sufficient amount even to an end portion of a display region, thereby uniformly radiating light in a sufficient amount to the entire display region, without a complicated structure.

Various investigations were made of a light unit which suppresses uneven luminance generated in display by radiating light in a sufficient amount even to an end portion of a display region, thereby uniformly radiating light in a sufficient amount to the entire display region, without a complicated structure. It was discovered that an insufficient amount of light is radiated from a plurality of light sources to the end portion of the display region, and therefore the luminance at the end portion is low. One or more light sources at a terminal among a plurality of light sources are arranged outside a lateral edge of the display region. As a result, light in a sufficient amount is caused to enter the end portion of the display region. Therefore, light in a sufficient amount can be uniformly radiated to the entire display region. As a result, the above-mentioned problems have been admirably solved, leading to completion of various preferred embodiments of the present invention.

A preferred embodiment of the present invention provides a light unit including a light guide plate and a plurality of light sources, the plurality of light sources being arranged in a line to oppose at least one side surface of the light guide plate, wherein one or more light sources adjacent to at least one terminal among the plurality of light sources are positioned outside a lateral edge of a display region.

The light unit according to preferred embodiments of the present invention includes a light guide plate and a plurality of light sources. The plurality of light sources are arranged in a line to oppose at least one side surface of the light guide plate. A colorless and transparent plate member having a certain thickness is preferably used as the light guide plate. With regard to the shape of each surface of the light guide plate, the shapes of a surface on the side parallel or substantially parallel to the display surface and a surface on the side perpendicular or substantially perpendicular to the display surface are not especially limited. For example, a rectangular shape, a trapezoidal shape, a wedge shape, and the like may be used. The kind of the light sources is not especially limited, but a point light source is preferably used. The light unit of preferred embodiments of the present invention may include other components as long as it essentially includes such components. For example, the light unit further includes a reflective film for reusing light, a diffusion sheet for reducing uneven luminance, a prism sheet for improving the luminance, and the like.

One or more light sources adjacent to at least one terminal among the plurality of light sources are positioned outside a lateral edge side of the display region. In addition, in the present description, the "display region" is a region which is actually used to display an image in the light-guide plate. The display region generally has the same configuration as that of the display screen. In the present description, the phrase "outside the lateral edge of the display region" means a region not opposing the display region. That is, it is a region that is outside of the display region in the horizontal direction, when the direction where light from a plurality of light sources is output is defined as a vertical direction and the direction where the plurality of light sources are arranged in a line is defined as a horizontal direction. Thus, according to preferred embodiments of the present invention, the light sources are arranged in a line longer than the display region of the light guide plate, and one or more light sources are arranged outside the lateral edge of the display region. As a result, light in a sufficient amount, output from the plurality of light sources, is radiated to even the end portions of the display region. Therefore, light in a sufficient amount is uniformly radiated to the entire display region. Accordingly, an excellent image in which uneven luminance is suppressed can be displayed. In preferred embodiments of the present invention, the effects of the present invention can be exhibited without a complicated structure. Therefore, the light unit is excellent in productivity. In preferred embodiments of the present invention, the plurality of light sources may be arranged on another side surface of the light guide plate. Further, some of the plurality of light sources may preferably be arranged on the opposite side surface. Display qualities at the end of the display region might be insufficiently improved if only one light source at the terminal is positioned outside the lateral edge of the display region, for example. In such a case, preferred embodiments of the present invention may also include two or more light sources at the terminal positioned outside the lateral edge of the display region.

It is preferable that one or more light sources at both terminals among the plurality of light sources are positioned outside the lateral edge of the display region. According to a preferred embodiment of the present embodiment, light in a sufficient amount, output from the plurality of light sources, can be radiated to both end portions of the display region. Therefore, uneven luminance can be suppressed in the entire display region, thereby further improving the display qualities. In the present description, the "one or more light sources at both terminals" means one or more light sources at each of right and left terminals among the plurality of light sources arranged in a line.

It is preferable that the plurality of light sources are light-emitting diodes (LEDs). The LED can be driven at a low voltage and it is excellent in high-speed response. Light emitted from the LED has a straight forward property (a directional property). Therefore, if an LED is used in a side-light type backlight or frontlight, a dark portion tends to be generated at the end portion of the display region. However, the light unit in a preferred embodiment of the present invention has a structure in which light from the plurality of light sources is directly radiated to the end portion of the display region. Therefore, the dark portion is hardly generated in the display region, and such a structure is particularly suitable when the LED is used.

It is preferable that the plurality of light sources are white light sources. White light can be output from one light source if the white light sources are used. The operation and effects of preferred embodiments of the present invention can be sufficiently exhibited just by arranging one light source outside the display region. Further, in comparison to the case where a set of light sources of red (R), green (G), blue (B), and the like, are arranged, costs of the light sources are low, no controller is needed, and the light unit can be easily produced if the white light sources are used. Further, the luminance and the chromaticity can be easily made uniform in the plane, and an excellent image can be displayed on a screen. If white light is obtained using a set of light sources of R, G, B, and the like, it is preferable that the set of light sources are arranged outside the display region.

It is preferable that a distance between a light source positioned outside the lateral edge of the display region and a light source adjacent to the light source positioned outside the lateral edge of the display region is substantially the same as a distance between light sources positioned on the lateral edge of the display region. When the light sources are arranged with a uniform distance therebetween, a light amount per unit irradiated region is uniformed. Therefore, light at a uniform amount is radiated to the entire display region. According to the present preferred embodiment, it is sufficient that the distances between the light sources are substantially the same as long as the light amount per unit irradiated region is uniform. Light from the light source positioned outside the lateral edge of the display region also has an influence on display. Accordingly, it is also preferable that a distance between the light source positioned outside the lateral edge of the display region and the light source adjacent thereto is also the same as a distance between the light sources positioned on the lateral edge of the display region.

It is preferable that a distance between a light source positioned outside the lateral edge of the display region and a light source adjacent to the light source positioned outside the lateral edge of the display region is smaller than a distance between light sources positioned on the lateral edge of the display region. According to this preferred embodiment, an increase in profile size of the light guide plate can be suppressed to the minimum while the effects of the present invention are obtained, that is, sufficient light is outputted to the outside of the lateral edge of the display region.

It is preferable that a light source positioned at an end among light sources positioned on the lateral edge of the display region is positioned to be in contact with an extension of a boundary of the display region. When the light source at the end is arranged at this position, sufficient light is radiated to the end portion of the display region, and the increase in the size of the light guide plate can be suppressed to the minimum.

It is preferable in the light unit that the light guide plate is extended to a region facing the one or more light sources positioned outside of the lateral edge of the display region. That is, it is preferable that the light guide plate is extended at least in a region opposing the plurality of light sources arranged in a line so that light outputted from the light sources passes through the light guide plate. As a result, light outputted from the light source arranged outside of the lateral edge of the display region is sufficiently used, and therefore, the operation and effects of various preferred embodiments of the present invention are sufficiently exhibited.

A preferred embodiment of the present invention is also a backlight including the light unit and a frontlight including the light unit. According to the frontlight or light unit, each including the above-mentioned light unit, sufficient light is uniformly radiated to the display region, and therefore uneven luminance is hardly caused. Thus, the operation and effects of a preferred embodiment of the present invention can be obtained.

A preferred embodiment of the present invention is also a display device including the light unit. The display device including the above-mentioned light unit is excellent in display qualities because sufficient light is uniformly radiated to the display region and therefore uneven luminance is hardly caused. It is particularly preferable that the display device according to a preferred embodiment of the present invention is a liquid crystal display device.

According to a preferred embodiment of the light unit of the present invention, generation of uneven luminance can be suppressed and excellent display qualities can be obtained because light in a sufficient amount can be radiated to the end portion of the display region and therefore, light in a sufficient amount can be uniformly radiated to the entire display region. In addition, the light unit is excellent in productivity because it has no complicated structure.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 1-1A through 1-1C are planar views schematically showing the light unit in accordance with a first preferred embodiment, wherein FIG. 1-1A shows a configuration of the light unit, FIG. 1-1B shows a state where lights from the respective light sources overlap with each other on the light guide plate, and FIG. 1-1C shows a measurement result of a luminance distribution.

FIG. 1-2 is a planar view schematically showing another light unit in accordance with the first preferred embodiment of the present invention.

FIG. 1-3 is a planar view schematically showing another light unit in accordance with the first preferred embodiment of the present invention.

FIG. 2-1 is a planar view schematically showing the light unit in accordance with a second preferred embodiment of the present invention.

FIG. 2-2 is a planar view schematically showing another light unit in accordance with the second preferred embodiment of the present invention.

FIG. 3 is a planar view schematically showing the light unit in accordance with a third preferred embodiment of the present invention.

FIG. 4-1 is a planar view schematically showing the light unit in accordance with a fourth preferred embodiment of the present invention.

FIG. 4-2 is a planar view schematically showing another light unit in accordance with the fourth preferred embodiment of the present invention.

FIG. 5-1 is a planar view schematically showing the light unit in accordance with a fifth preferred embodiment of the present invention.

FIG. 5-2 is a planar view schematically showing another light unit in accordance with the fifth preferred embodiment of the present invention.

FIG. 6-1 is a planar view schematically showing the light unit in accordance with a sixth preferred embodiment of the present invention.

FIG. 6-2 is a planar view schematically showing another light unit in accordance with the sixth preferred embodiment of the present invention.

FIG. 8-1 is a planar view schematically showing the light unit in accordance with an eighth preferred embodiment of the present invention.

FIG. 8-2 is a planar view schematically showing another light unit in accordance with the eighth preferred embodiment of the present invention.

FIG. 10-1 is a planar view schematically showing the light unit in accordance with a tenth preferred embodiment of the present invention.

FIG. 10-2 is a planar view schematically showing another light unit in accordance with the tenth preferred embodiment of the present invention.

FIG. 11-1 is a planar view schematically showing the light unit in accordance with an eleventh preferred embodiment of the present invention.

FIG. 11-2 is a planar view schematically showing the light unit in accordance with the eleventh preferred embodiment of the present invention.

FIG. 12-1 is a planar view schematically showing the light unit in accordance with a twelfth preferred embodiment of the present invention.

FIG. 12-2 is a planar view schematically showing another light unit in accordance with the twelfth preferred embodiment of the present invention.

FIGS. 15A-15C are planar views schematically showing one example of a conventional light unit, wherein FIG. 15A shows a configuration of the light unit, FIG. 15B shows a state where lights from the respective light sources overlap with each other on the light guide plate, FIG. 15C shows a measurement result of a luminance distribution.

DETAILED DESCRIPTION OF THE PREFERRED EMBODIMENTS

Preferred embodiments of the present invention are described in more detail below with reference to the drawings. However, the present invention is not limited to only these described preferred embodiments.

First Preferred Embodiment

Figures 1, 1A:
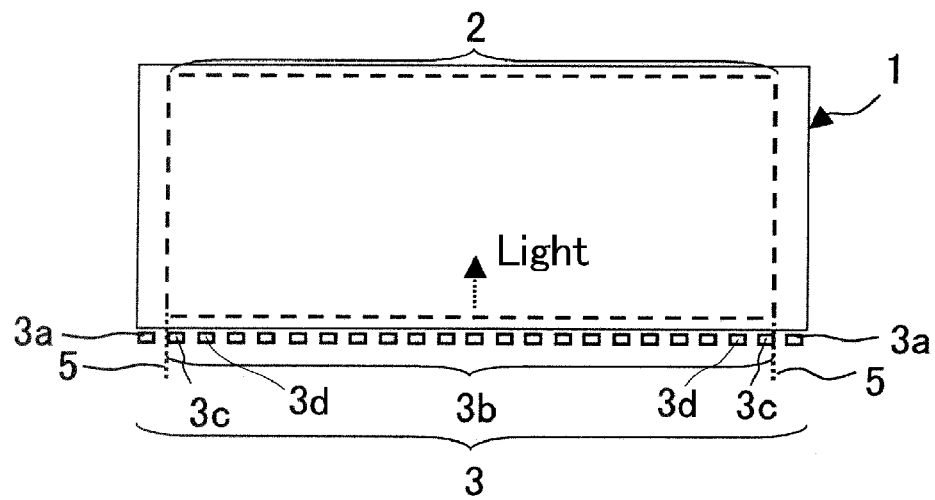
Figures 1, 1B:
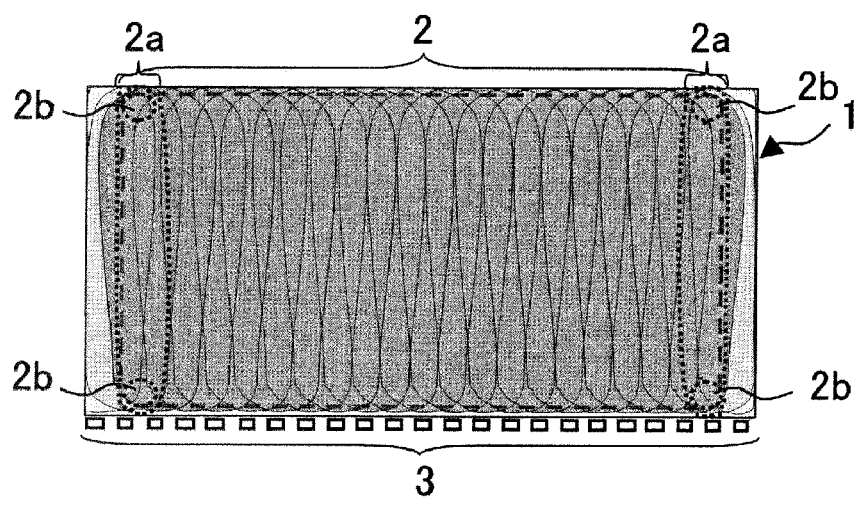
Figures 1, 1C:
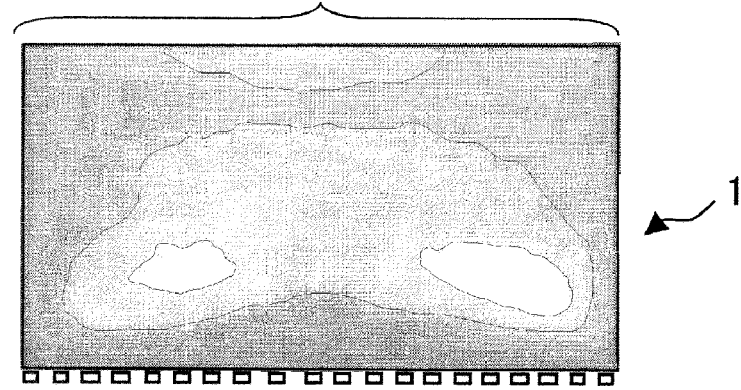

FIGS. 1-1A to 1-1C are planar views schematically showing an arrangement relationship between light sources and a light guide plate in a light unit in accordance with a first preferred embodiment. FIG. 1-1A schematically shows a configuration of the light unit. FIG. 1-1B schematically shows a state where lights from the light sources overlap with each other on the light guide plate. FIG. 1-1C shows a measurement result of a luminance distribution. As shown in FIG. 1-1A, the light unit in a first preferred embodiment includes a rectangular or substantially rectangular light guide plate 1 and a plurality of light sources 3. The plurality of light sources 3 are arranged in a line to oppose one side surface on the side of a long side of four sides of the light guide plate 1. White LEDs are preferably used as the light sources 3. The use of the white light sources has the following advantages in comparison to the case where a set of light sources such as red (R), green (G), and blue (B) are arranged: costs on the light sources can be reduced; no controller is needed; and the light unit can be easily produced. Further, due to the use of the white light sources, the luminance and the chromaticity can be easily uniformed in the plane, and excellent images can be displayed on a screen. Terminal light sources 3a among these plurality of light sources 3 are each arranged in a region which faces a display region 2 (region shown by the dotted line in the figure) and which is outside the lateral edge of the display region 2. That is, the terminal light sources 3a among the light sources 3 which are arranged in a row to oppose the side surface of the light guide plate 1 do not directly oppose the display region 2.

As shown in FIG. 1-1B, light emitted from the white LED light source 3 has a straight forward property, but it is diffused on the light guide plate 1 as it goes forward. Accordingly, lights emitted from two adjacent light sources overlap with each other, and light in a sufficient amount, suitable for display, is guided into the display surface. The terminal light sources 3a themselves among the light sources 3 which are arranged in a line to oppose the side surface of the light guide plate are arranged in a region not opposing the display region 2. However, light emitted from the terminal light sources 3a passes through the display region 2 and this light overlaps with light emitted from a light source 3c adjacent to the light source 3a and a light source 3d adjacent to the light source 3c. As a result, light in a sufficient amount is also radiated to end portions 2a, i.e., corner portions 2b of the display region 2.

Figure 15A:
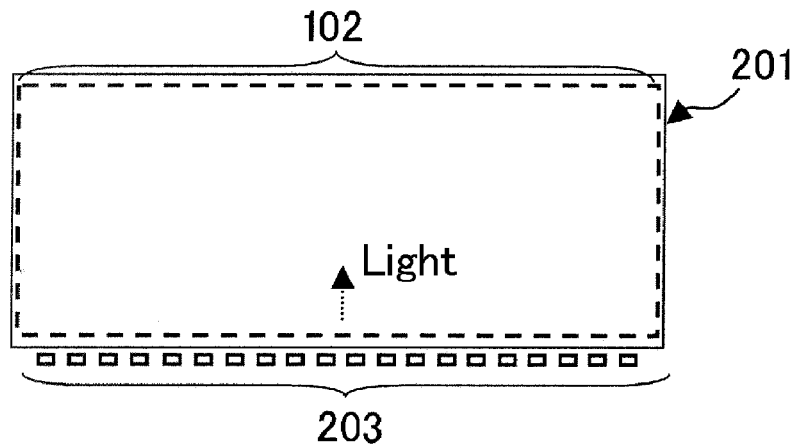
Figure 15B:
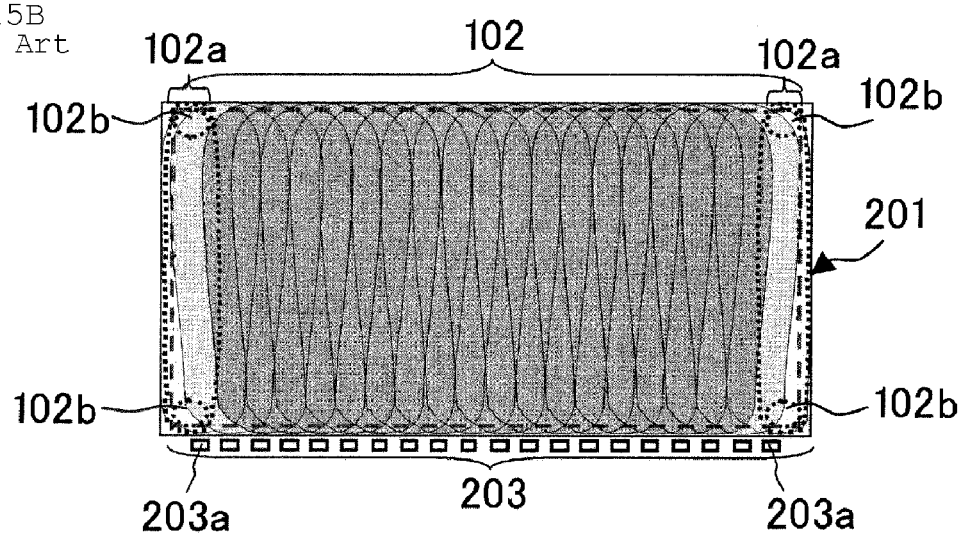
Figure 15C:
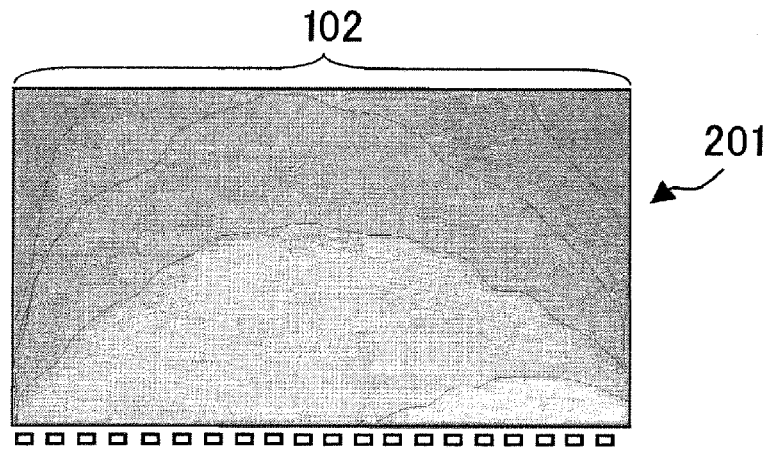

The contour line shown in FIG. 1-1C shows a level of the luminance. As the color is lighter, the luminance is higher. As shown in FIG. 15C, in the conventional art, the luminance of light is gradually decreased as the light is separated from the side surface on the side where the light sources are arranged of the light guide plate. The luminance is small at end portions 102a and particularly corner portions 102b of the display region. In contrast, according to a preferred embodiment of the present invention, a sufficient and uniform luminance is obtained in the entire display region because sufficient light is radiated to these regions 2a and 2b, as shown in FIG. 1-1C. In FIGS. 1-1C and 15C, the brightest region is colored with white and other regions are colored based on the luminance relative to the brightest region. These are absolutely different in brightness. That is, according to FIG. 1-1C, a dark portion seems to be partly generated, but in practice, the luminance is absolutely high in comparison to FIG. 15C. As shown in FIG. 1-1C, the light source is arranged at the terminal, and thereby the light amount on the light guide plate is increased. Therefore, a portion where the luminance is high is closer to the center in comparison to the conventional art. Thus, the luminance is more uniform. As shown in FIG. 1-1C, the luminance is slightly increased in the region which is the farthest from the light source. This is because reflective light from the end of the light guide plate increases the luminance. It shows that light is sufficiently radiated. This phenomenon is not observed when the light amount is insufficient as in FIG. 15C. Thus, according to the first preferred embodiment, images with more excellent display qualities can be displayed in comparison to the conventional embodiment.

According to the first preferred embodiment, the light sources 3 are arranged with substantially the same distance therebetween. A distance between the terminal light source 3a positioned outside of the lateral edge of the display region 2 and a light source 3c adjacent to this terminal light source 3a is substantially the same as a distance between the light sources 3b positioned on the lateral edge of the display region 2. According to this arrangement of the light sources 3, a light amount per unit irradiated region is uniformed, and therefore light at a uniform amount is radiated to the entire display region 2. Further, the light source 3c which is positioned at the end among the light sources 3b positioned on the lateral edge of the display region 2 is positioned to be in contact with an extension 5 of a boundary on the side of a short side among boundaries of the display region 2. According to the arrangement of the light sources 3, light in a sufficient amount can be radiated to the end portion 2a of the display region and an increase in size of the light guide plate 1 can be suppressed to a minimum. According to the light unit in the first preferred embodiment, the profile size of the light guide plate 1 is increased because these terminal light sources 3a are arranged. That is, the light guide plate 1 is extended to a region which faces the light sources 3 positioned outside the lateral edge of the display region 2. If the size of the light guide plate 1 is increased, light output from the light source 3a arranged outside the lateral edge of the display region 2 is sufficiently used. As a result, the operation and effects of preferred embodiments of the present invention can be sufficiently exhibited.

As mentioned above, according to the arrangement of the light sources 3 in the first preferred embodiment, sufficient light is radiated to the end portions 2a, i.e., the corner portions 2b, of the display region 2. Accordingly, an image with excellent display qualities, which hardly have uneven luminance in the entire display region 2, can be displayed.

The light unit in the first preferred embodiment generally includes a reflective film arranged on the light guide plate 1, a diffusion sheet arranged on the display side of the light guide plate 1, and a prism sheet, in addition to the light guide plate 1 and the light source 3. The material for the light guide plate 1 is not especially limited, but an acrylic resin excellent in light transmissivity may be used, for example. The back surface (surface not opposing the display screen) of the light guide plate is generally provided with a pattern arranged to refract or scatter light from the light source 3 to the display side. The pattern is provided by printing, for example. Alternatively, the back surface of the light guide plate 1 is not provided with such a pattern, and the light guide plate 1 may include a reflective, refractive, or diffusion portion. A liquid crystal display panel in which a polarizer, an active matrix substrate, a liquid crystal layer, a color filter substrate, and the like, are stacked in this order is equipped with this light source as a backlight or a front light. As a result, a liquid crystal display device excellent in display qualities can be obtained.

Figures 1, 2:
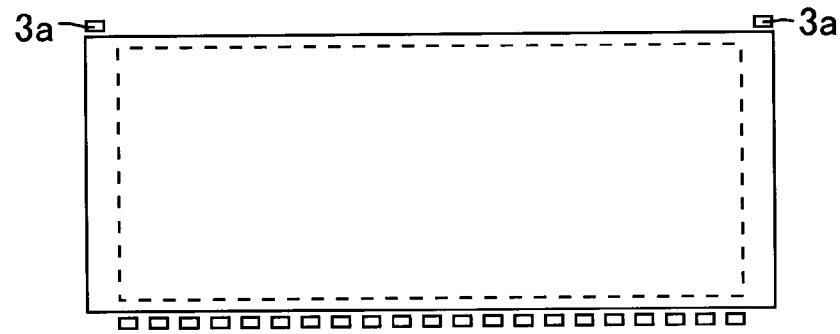
Figures 1, 2, 3:
Figures 1, 2:
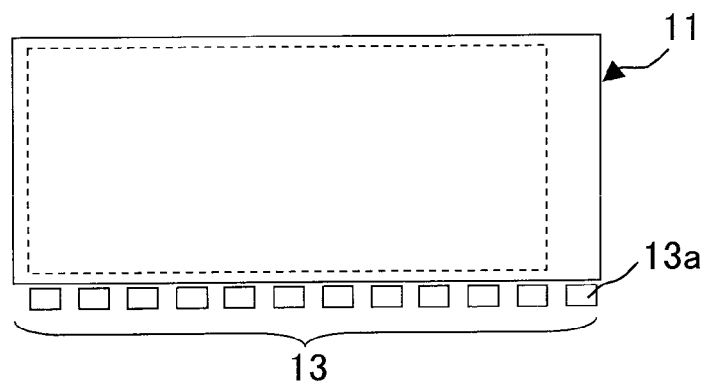
Figure 2:
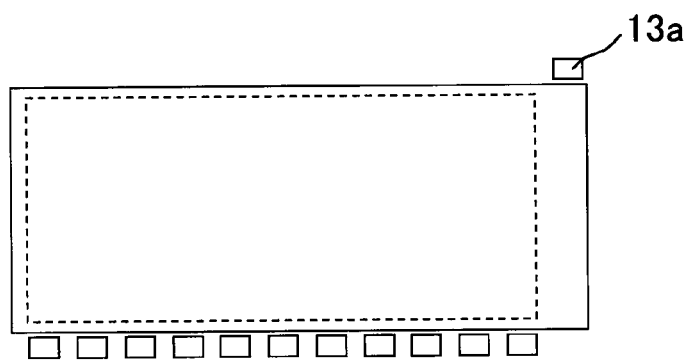
Figure 3:
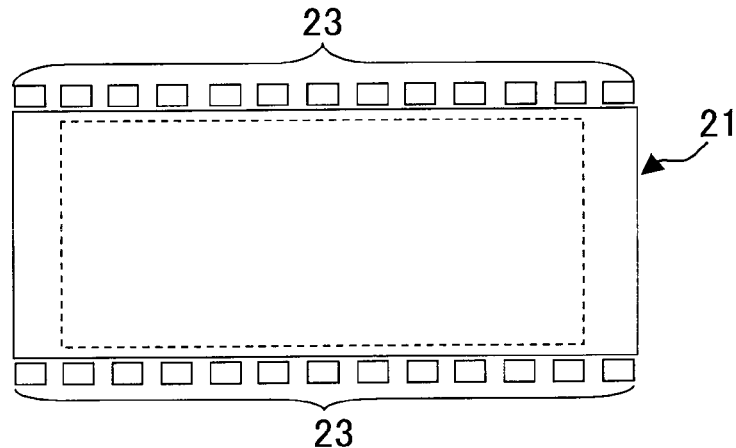

In the first preferred embodiment, the light sources 3 may not be arranged on one side of the light guide plate 1. Some light sources may be arranged on the opposite side, as shown in FIGS. 1-2 and 1-3, for example. FIG. 1-2 shows a preferred embodiment in which the terminal light sources 3a positioned outside the display region among the light sources arranged in a line are arranged on the opposite side. FIG. 1-3 shows a preferred embodiment in which the terminal light sources 3a positioned outside the display region and the light sources 3c positioned at the end inside the display region, among the light sources arranged in a line, are arranged on the opposite side.

Second Preferred Embodiment

FIG. 2-1 is a planar view schematically showing a light unit in accordance with the second preferred embodiment. The light unit in the second preferred embodiment is different from that in the first preferred embodiment in that light sources 13a positioned outside the lateral edge of the display region are arranged only at one terminal, not at both terminals of the line where light sources 13 are arranged. The configuration in the second preferred embodiment is obtained just by extending only one side of the light guide plate 11. Accordingly, the second preferred embodiment can be preferably used if an increase in size of the display region is limited or the display device needs to be downsized.

In the second preferred embodiment, the light sources 13 may not be arranged on one side of the light guide plate 11. Some light sources may be arranged on the opposite side, for example, as shown in FIG. 2-2. FIG. 2-2 shows a preferred embodiment in which the terminal light sources 13a positioned outside the display region among the light sources arranged in a line are arranged on the opposite side.

Third Preferred Embodiment

FIG. 3 is a planar view schematically showing a light unit in accordance with the third preferred embodiment. The light unit in the third preferred embodiment is different from that in the first preferred embodiment in that a plurality of light sources 23 are arranged in one line on side surfaces on the side of both long sides of a rectangular light guide plate 21. Similarly in the first preferred embodiment, generation of uneven luminance in the display region can be suppressed even in the light unit in the third preferred embodiment. As a result, excellent display qualities can be obtained. In addition, the light sources 23 are arranged on the both side surfaces of the light guide plate, and therefore an image with a higher luminance can be displayed.

Fourth Preferred Embodiment

Figures 1, 4:
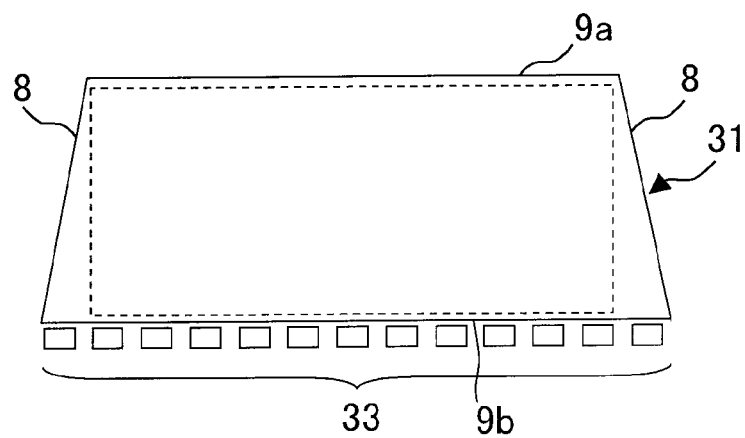
Figures 2, 4:
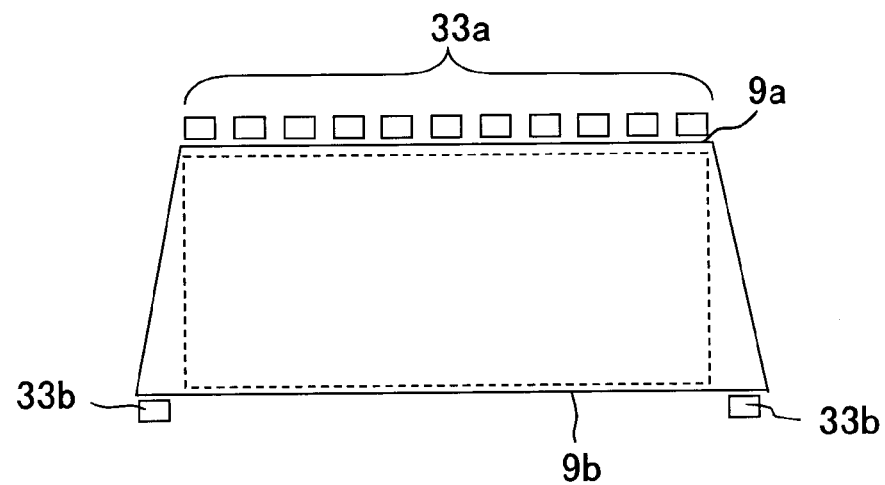

FIG. 4-1 is a planar view schematically showing a light unit in accordance with the fourth preferred embodiment. The light unit in the fourth preferred embodiment is different from that in the first preferred embodiment in that a main surface from which light is outputted of a light guide plate 31 has a trapezoidal shape. According to the light guide plate 31, bottom sides 9a and 9b are longer than an oblique side 8. A plurality of light sources 33 are arranged in one line on the side of the longer bottom side 9b of the light guide plate 31. Similarly in the first preferred embodiment, generation of uneven luminance in the display region can be suppressed even in the light unit in the fourth preferred embodiment. As a result, excellent display qualities can be obtained. Further, the profile size of the light unit can be deceased because of such a light guide plate having a trapezoidal shape. In addition, a frame of the light unit can be fixed to the light guide plate at an inclined surface portion of the light guide plate.

In the fourth preferred embodiment, the light sources 33 may not be arranged on one side of the light guide plate 31. Some light sources may be arranged on the opposite side, as shown in FIG. 4-2, for example. FIG. 4-2 shows a preferred embodiment in which light sources 33a that are most of the light sources arranged in a line are arranged in a line on the side of the shorter bottom side 9a and terminal light sources 33b positioned outside the display region are arranged on the side of the longer bottom side 9b.

Fifth Preferred Embodiment

Figures 1, 5:
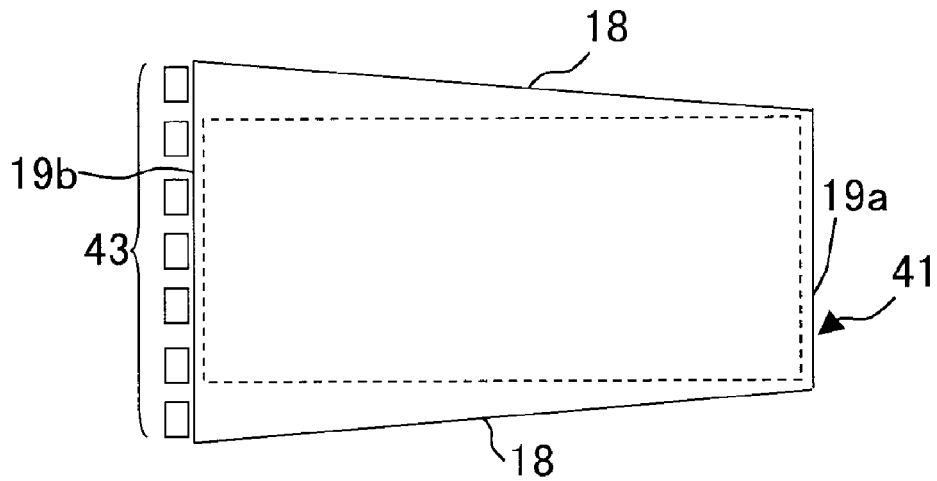
Figures 2, 5:
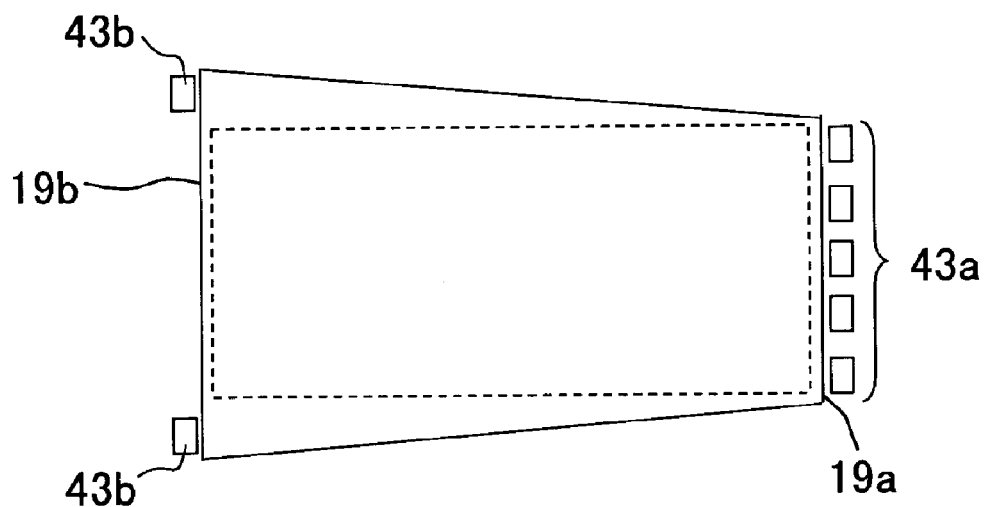

FIG. 5-1 is a planar view schematically showing a light unit in accordance with the fifth preferred embodiment. The light unit in the fifth preferred embodiment is different from that in the fourth preferred embodiment in that bottom sides 19a and 19b are shorter than an oblique side 18. Similarly in the first preferred embodiment, generation of uneven luminance in the display region can be suppressed even in the light unit in the fifth preferred embodiment. As a result, excellent display qualities can be obtained. Further, the profile size of the light unit can be deceased because of such a light guide plate having a trapezoidal shape.

In addition, a frame of the light unit can be fixed to the light guide plate at an inclined surface portion of the light guide plate. In comparison to the fourth preferred embodiment, fewer light sources are used in the present preferred embodiment.

In the fifth preferred embodiment, the light sources 43 may not be arranged on one side of the light guide plate 41. Some light sources may be arranged on the opposite side, as shown in FIG. 5-2, for example. FIG. 5-2 shows a preferred embodiment in which light sources 43*a* that are most of the light sources arranged in a line are arranged in a line on the side of the shorter bottom side 19*a* and terminal light sources 43*b* positioned outside the display region are arranged on the side of the longer bottom side 19*b*.

Sixth Preferred Embodiment

Figures 1, 6:
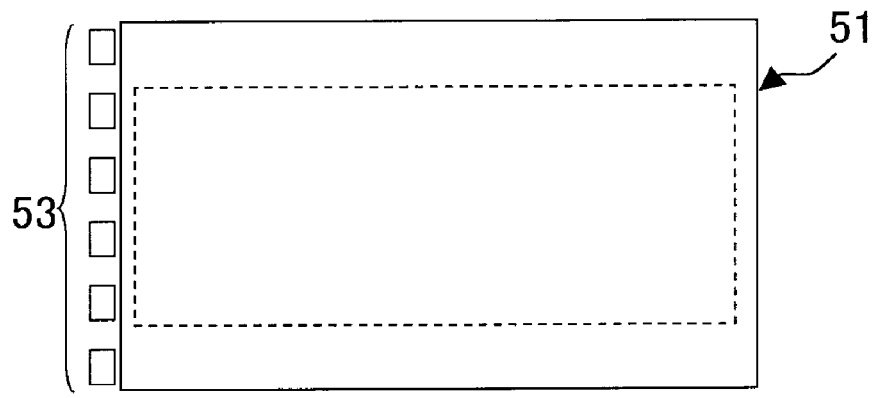
Figures 2, 6:
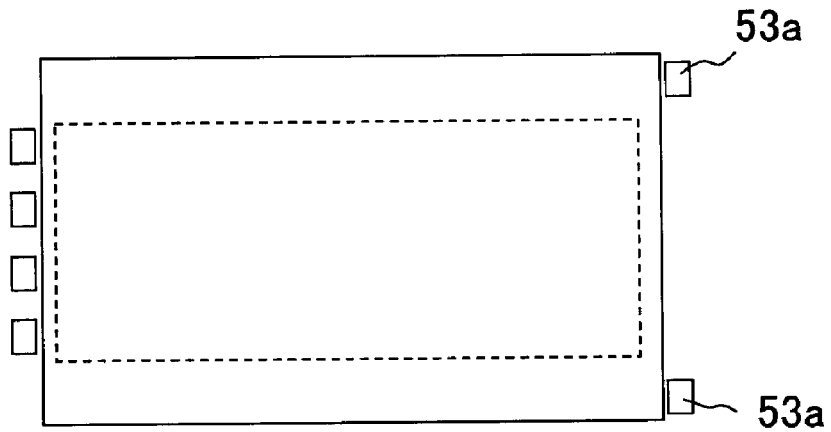

FIG. 6-1 is a planar view schematically showing a light unit in accordance with the sixth preferred embodiment. The light unit in the sixth preferred embodiment is different from that in the first preferred embodiment in that a plurality of light sources 53 are arranged in one line on a side surface on the side of one short side of a rectangular light guide plate 51. Similarly in the first preferred embodiment, generation of uneven luminance in the display region can be suppressed even in the light unit in the sixth preferred embodiment. As a result, excellent display qualities can be obtained. In comparison to the first preferred embodiment, fewer light sources are used in the present preferred embodiment.

In the sixth preferred embodiment, the light sources 53 may not be arranged on one side of the light guide plate 51. Some light sources may be arranged on the opposite side, as shown in FIG. 6-2, for example. FIG. 6-2 shows a preferred embodiment in which terminal light sources 53*a* positioned outside the display region among light sources arranged in a line are arranged on the opposite side.

Seventh Preferred Embodiment

Figure 7:
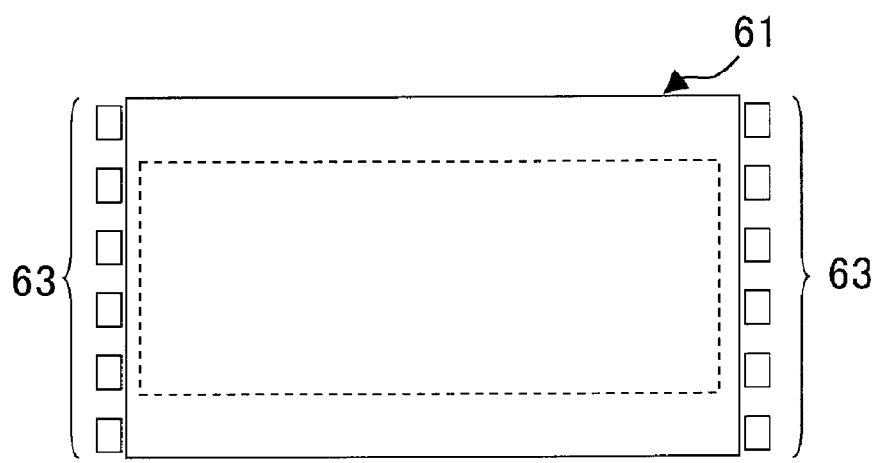
FIG. 7 is a planar view schematically showing the light unit in accordance with a seventh preferred embodiment of the present invention.

FIG. 7 is a planar view schematically showing a light unit in accordance with the seventh preferred embodiment. The light unit in the seventh preferred embodiment is different from that in the sixth preferred embodiment in that a plurality of light sources 63 are arranged in one line on side surfaces on the side of both short sides of a rectangular light guide plate 61. Similarly in the sixth preferred embodiment, generation of uneven luminance in the display region can be suppressed even in the light unit in the seventh preferred embodiment. As a result, excellent display qualities can be obtained. In addition, the light sources 63 are arranged on the both side surfaces of the light guide plate 61, and therefore an image with a higher luminance can be displayed, in comparison to the sixth preferred embodiment.

Eighth Preferred Embodiment

Figures 1, 8:
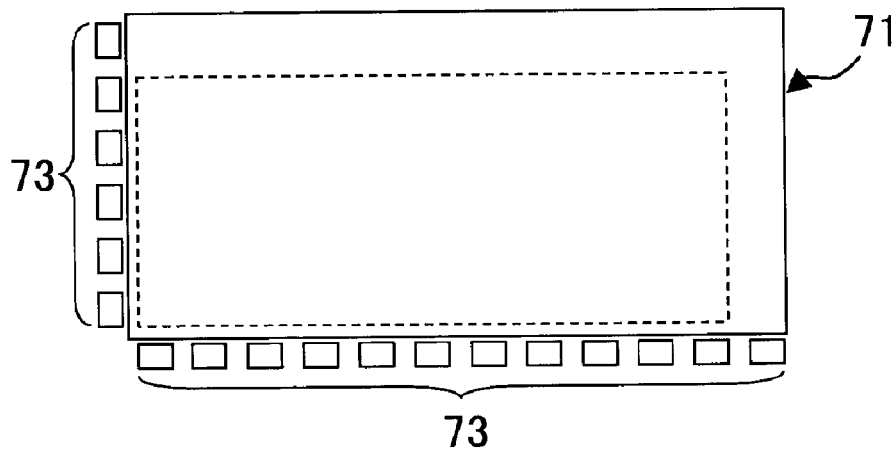
Figures 2, 8:
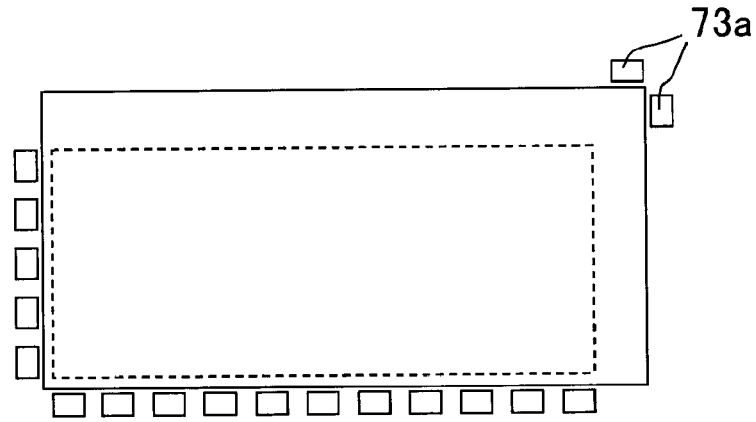

FIG. 8-1 is a planar view schematically showing a light unit in accordance with the eighth preferred embodiment. The light unit in the eighth preferred embodiment is different from that in the first preferred embodiment in that a plurality of light sources 73 are arranged in one line on a side surface on the side of one short side and on a side surface on the side of one long side of a rectangular light guide plate 71. Similarly in the first preferred embodiment, generation of uneven luminance in the display region can be suppressed even in the light unit in the eighth preferred embodiment. As a result, excellent display qualities can be obtained. The light sources 73 are arranged on a side surface on the side of one short side and on a side surface on the side of one long side, and therefore, an image with a higher luminance can be obtained. In addition, the light sources 73 are arranged only on one short-side side and one long-side side of the display region. Therefore, the profile size of the light guide plate needs not to be increased in the long-side direction.

In the eighth preferred embodiment, the light sources 73 may not be arranged on one side of the light guide plate 71. Some light sources may be arranged on the opposite side, as shown in FIG. 8-2, for example. FIG. 8-2 shows a preferred embodiment in which terminal light sources 73*a* positioned outside the display region among light sources arranged in a line are arranged on the opposite side.

Ninth Preferred Embodiment

Figure 9:
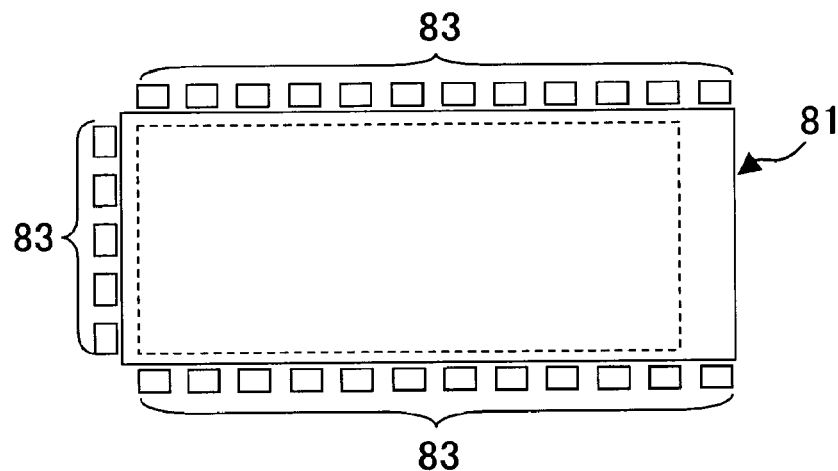
FIG. 9 is a planar view schematically showing the light unit in accordance with a ninth preferred embodiment of the present invention.

FIG. 9 is a planar view schematically showing a light unit in accordance with the ninth preferred embodiment. The light unit in the ninth preferred embodiment is different from that in the eighth preferred embodiment in that a plurality of light sources 83 are arranged in one line on a side surface on the side of one short side and on side surfaces on the side of both long sides of a rectangular light guide plate 81. Similarly in the eighth preferred embodiment, generation of uneven luminance in the display region can be suppressed even in the light unit in the ninth preferred embodiment. As a result, excellent display qualities can be obtained. The light sources 83 are arranged on a side surface on the side of one short side and on side surfaces on the side of both long sides, and therefore, an image with a higher luminance can be displayed, in comparison to the eighth preferred embodiment. In addition, the plurality of light sources are arranged only on one side of a region outside the display region. Therefore, the profile size of the light guide plate is not extended or increased in the long-side direction.

Tenth Preferred Embodiment

Figures 1, 10:
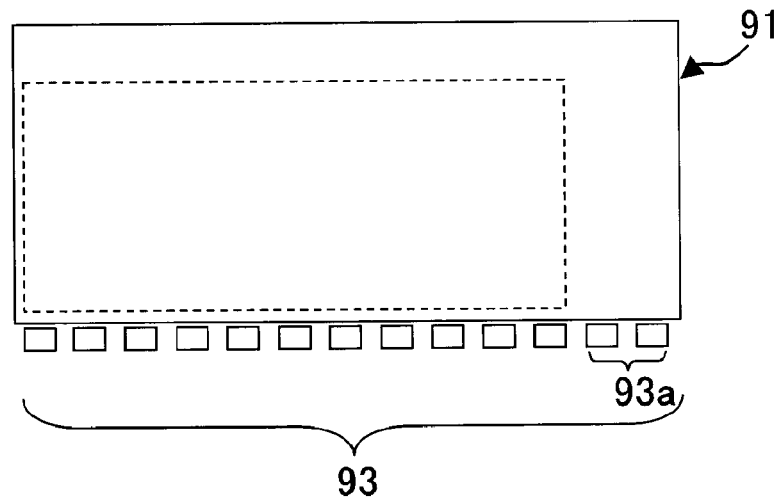
Figures 2, 10:
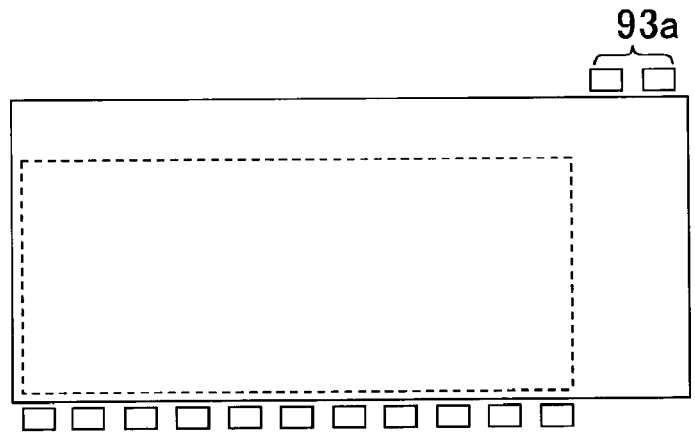

FIG. 10-1 is a planar view schematically showing a light unit in accordance with the tenth preferred embodiment. The light unit in the tenth preferred embodiment is the same as that in the first preferred embodiment in that a plurality of light sources 93 are arranged in one line on a side surface on the side of one long side of a rectangular light guide plate 91, but it is different from that in the first preferred embodiment in that two light sources 93*a* are arranged in one region outside the lateral edge of the display region. Similarly in the first preferred embodiment, generation of uneven luminance in the display region can be suppressed even in the light unit in the tenth preferred embodiment. As a result, excellent display qualities can be obtained. The two light sources 93*a* are arranged on one region outside the lateral edge of the display region. Therefore, such a light unit can be preferably used if the uniformity of the luminance in the display region is improved by radiating light in a sufficient amount to this region.

In the tenth preferred embodiment, the light sources 93 may not be arranged on one side of the light guide plate 91. Some light sources may be arranged on the opposite side, as shown in FIG. 10-2, for example. FIG. 10-2 shows an embodiment in which the terminal light sources 93*a* positioned outside the display region among the light sources arranged in a line are arranged on the opposite side.

Eleventh Preferred Embodiment

Figures 1, 11:
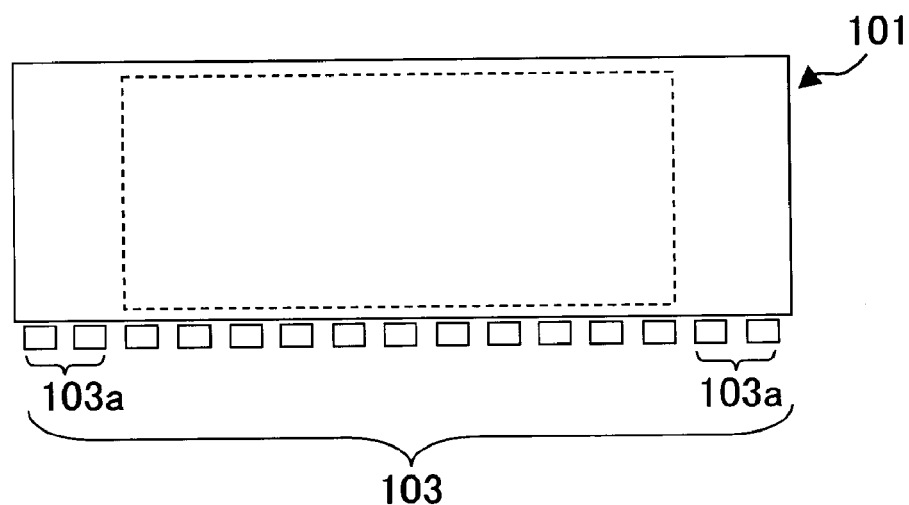
Figures 2, 11:
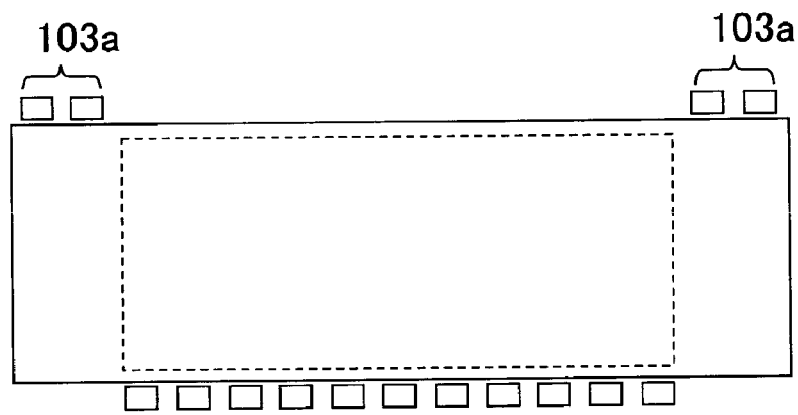

FIG. 11-1 is a planar view schematically showing a light unit in accordance with the eleventh preferred embodiment. The light unit in the eleventh preferred embodiment is the same as that in the first preferred embodiment in that a plurality of light sources 103 are arranged in one line on a side surface on the side of one long side of a rectangular light guide 101, but it is different from that in the first preferred embodiment in that two light sources 103a are arranged in both regions outside the lateral edge of the display region. Similarly in the first preferred embodiment, generation of uneven luminance in the display region can be suppressed even in the light unit in the eleventh preferred embodiment. As a result, excellent display qualities can be obtained. In addition, the two light sources 103a are arranged on both regions outside the lateral edge of the display region. Therefore, such a light unit can be preferably used if the uniformity of the luminance in the display region is improved by radiating light in a sufficient amount to this region.

In the eleventh preferred embodiment, the light sources 103 may not be arranged on one side of the light guide plate 101. Some light sources may be arranged on the opposite side, as shown in FIG. 11-2, for example. FIG. 11-2 shows a preferred embodiment in which the terminal light sources 103a positioned outside the display region among the light sources arranged in a line are arranged on the opposite side.

Twelfth Preferred Embodiment

Figures 1, 12:
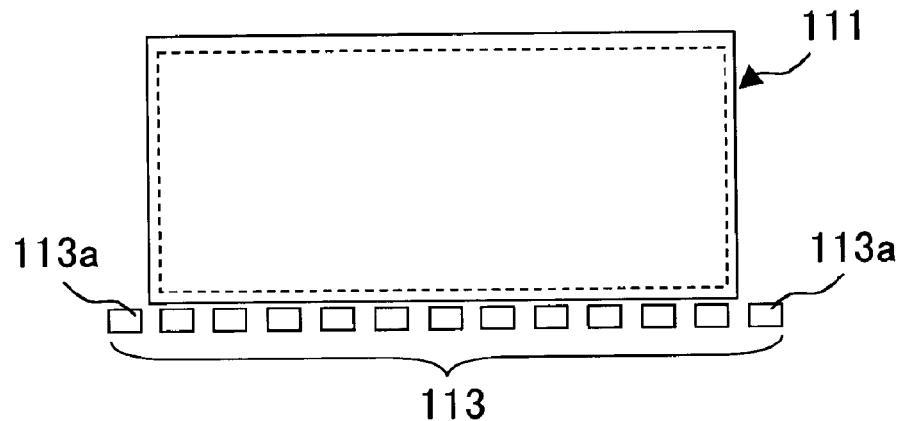
Figures 2, 12:
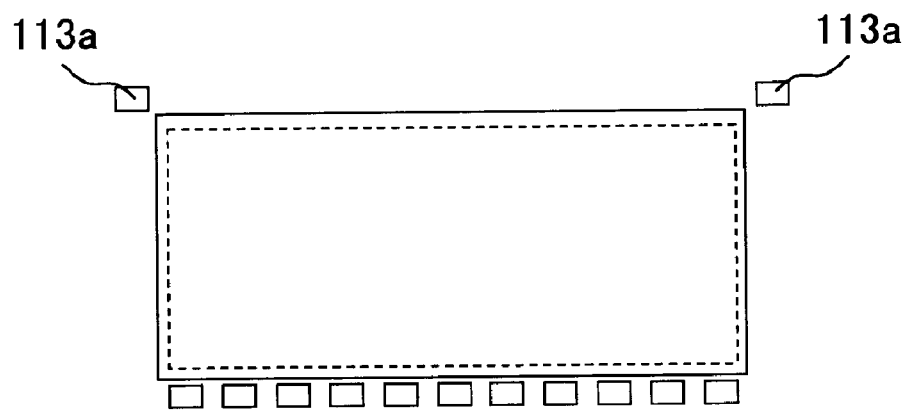

FIG. 12-1 is a planar view schematically showing a light unit in accordance with the twelfth preferred embodiment. The light unit in the twelfth preferred embodiment is the same as that in the first preferred embodiment in that a plurality of light sources 113 are arranged in one line on a side surface on the side of one long side of a rectangular light guide 111, but it is different from that in the first preferred embodiment in that the light guide plate is not extended outside the lateral edge of the display region, that is, in regions facing the terminal light sources 113a. Similarly in the first preferred embodiment, generation of uneven luminance in the display region can be suppressed even in the light unit in the twelfth preferred embodiment. As a result, excellent display qualities can be obtained. According to the present preferred embodiment, the size of the light guide plate needs not to be increased.

In the twelfth preferred embodiment, the light sources 113 may not be arranged on one side of the light guide plate 111. Some light sources may be arranged on the opposite side, as shown in FIG. 12-2, for example. FIG. 12-2 shows a preferred embodiment in which the terminal light sources 113a positioned outside the display region among the light sources arranged in a line are arranged on the opposite side.

Thirteenth Preferred Embodiment

Figure 13:
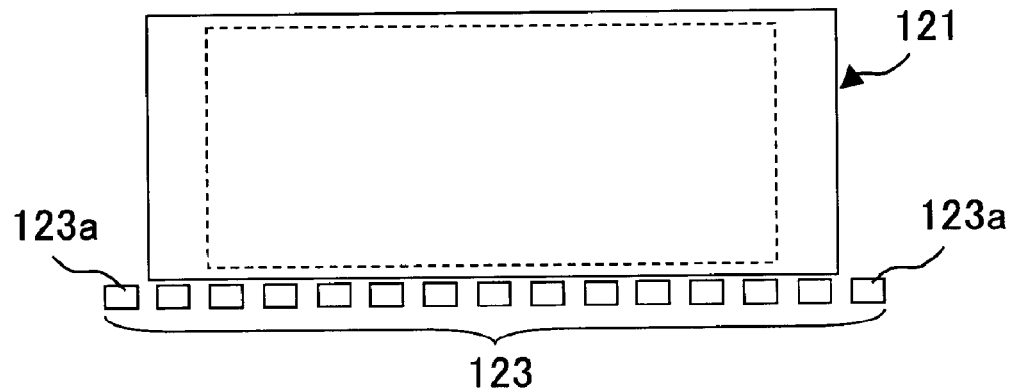
FIG. 13 is a planar view schematically showing the light unit in accordance with a thirteenth preferred embodiment of the present invention.

FIG. 13 is a planar view schematically showing a light unit in accordance with the thirteenth preferred embodiment. The light unit in the thirteenth preferred embodiment is the same as that in the first preferred embodiment in that a plurality of light sources 123 are arranged in one line on a side surface on the side of one long side of a rectangular light guide plate 121, but it is different from that in the first preferred embodiment in that light sources 123a at both terminals are arranged in a region that is further outside of the lateral edge of the light guide plate 121. Similarly in the first preferred embodiment, generation of uneven luminance in the display region can be suppressed even in the light unit in the thirteenth preferred embodiment. As a result, excellent display qualities can be obtained. Further, two light sources are each arranged in a region that is outside of the lateral edge of the display region. Therefore, such a light unit can be preferably used if the uniformity of the luminance in the display region is improved by radiating light in a sufficient amount to this region.

Fourteenth Preferred Embodiment

Figure 14:
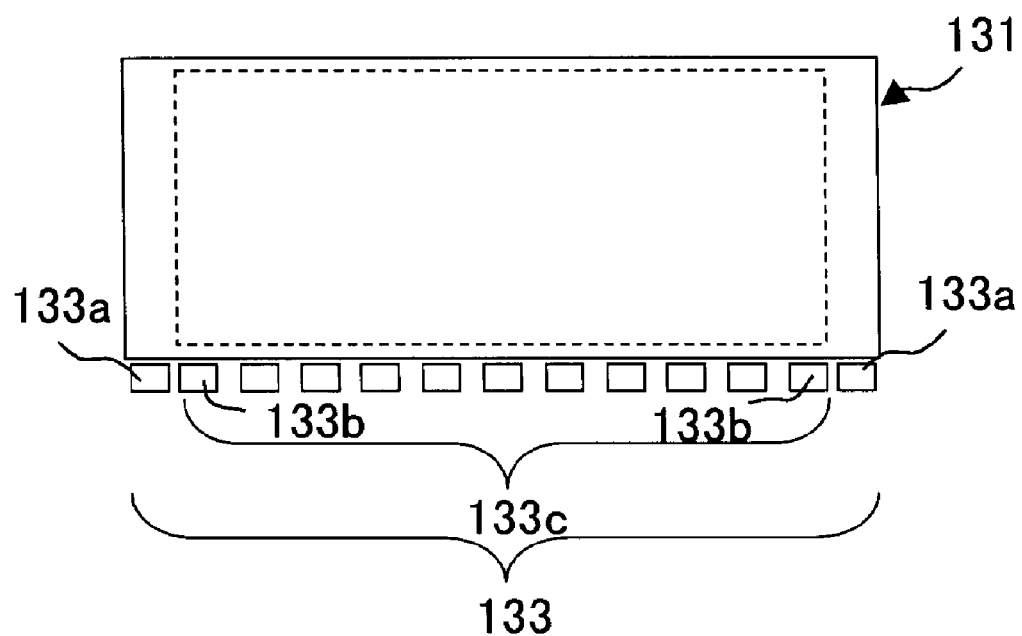
FIG. 14 is a planar view schematically showing the light unit in accordance with a fourteenth preferred embodiment of the present invention.

FIG. 14 is a planar view schematically showing a light unit in accordance with the fourteenth preferred embodiment. The light unit in the fourteenth preferred embodiment is the same as that in the first preferred embodiment in that a plurality of light sources 133 are arranged in one line on a side surface on the side of one long side of a rectangular light guide 131. However, a distance between light sources 133c positioned inside the lateral edge of the display region is larger than a distance between a terminal light source 133a and a light source 133b adjacent thereto. Similarly in the first preferred embodiment, generation of uneven luminance in the display region can be suppressed even in the light unit in the fourteenth preferred embodiment. As a result, excellent display qualities can be obtained. In addition, the profile size of the light guide plate needs not to be increased because the distance between the light source 133a positioned outside the lateral edge of the display region and the adjacent light source 133b is decreased. Therefore, such a light unit can be preferably used if the size of the light guide plate is limited or the display device needs to be downsized.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A light unit comprising:
   a light guide plate and a plurality of light sources, the plurality of light sources being arranged in a line to oppose at least one side surface of the light guide plate; wherein
   one or more light sources adjacent to at least one terminal among the plurality of light sources are positioned outside a lateral edge of a display region which displays information; and
   the light guide plate is extended to a region opposed to one of the plurality of light sources positioned at an end of the line of the plurality of light sources.

2. The light unit according to claim 1, wherein each of the one or more light sources that are adjacent to the terminals are positioned outside the lateral edge of the display region.

3. The light unit according to claim 1, wherein the plurality of light sources are light-emitting diodes.

4. The light unit according to claim 1, wherein the plurality of light sources are white light sources.

5. The light unit according to claim 1, wherein a distance between a light source positioned outside the lateral edge of the display region and a light source adjacent to the light source positioned outside the lateral edge of the display region is substantially the same as a distance between light sources positioned on the lateral edge of the display region.

6. The light unit according to claim 1, wherein a distance between a light source positioned outside the lateral edge of the display region and a light source adjacent to the light source positioned outside the lateral edge of the display region is smaller than a distance between light sources positioned on the lateral edge of the display region.

7. The light unit according to claim 1, wherein a light source positioned at an end among light sources positioned on the lateral edge of the display region is positioned to be in contact with an extension of a boundary of the display region.

8. A backlight comprising the light unit of claim 1.

9. A frontlight comprising the light unit of claim 1.

10. A display device comprising the light unit of claim 1.

11. The display device according to claim 10, wherein the display device is a liquid crystal display device.

12. The light unit according to claim 1, wherein the plurality of light sources are arranged in two lines extending along respective sides of the light guide plate, the plurality of light sources positioned outside the lateral edge of the display region are positioned in one of the two lines that is arranged opposite to the other of the two lines, the other of the two lines including the light sources positioned on the lateral edge of the display region.

13. The light unit according to claim 1, wherein there is no reflection member positioned between the light source positioned at the end of the display region and the light guide plate.

14. The light unit according to claim 1, wherein the display region includes a major surface with a length and a width, the length and the width of the major surface of the display region being respectively smaller than a corresponding length and a corresponding width of a major surface of the light guide plate such that the major surface of the display region is smaller than the major surface of the light guide plate.

* * * * *